(12) United States Patent
Kang (10) Patent No.: US 11,392,222 B2
(45) Date of Patent: Jul. 19, 2022

(54) ELECTRONIC DEVICE, AND METHOD FOR CONTROLLING EXTERNAL ELECTRONIC DEVICE ON BASIS OF USAGE STATE OF ELECTRONIC DEVICE

(71) Applicant: Samsung Electronics Co., Ltd., Gyeonggi-do (KR)

(72) Inventor: Ildong Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/965,711

(22) PCT Filed: Feb. 20, 2019

(86) PCT No.: PCT/KR2019/002031
§ 371 (c)(1),
(2) Date: Jul. 29, 2020

(87) PCT Pub. No.: WO2019/164238
PCT Pub. Date: Aug. 29, 2019

(65) Prior Publication Data
US 2021/0034175 A1    Feb. 4, 2021

(30) Foreign Application Priority Data

Feb. 20, 2018    (KR) .......................... 10-2018-0019997

(51) Int. Cl.
*G06F 3/0354* (2013.01)
*G06F 3/041* (2006.01)
*G06F 3/043* (2006.01)

(52) U.S. Cl.
CPC ........ *G06F 3/03545* (2013.01); *G06F 3/0416* (2013.01); *G06F 3/0433* (2013.01)

(58) Field of Classification Search
CPC ... G06F 3/03545; G06F 3/0416; G06F 3/0433
USPC ....................................... 345/173, 174, 179
See application file for complete search history.

(56) References Cited

U.S. PATENT DOCUMENTS

| 10,037,102 | B2 | 7/2018 | Hashimoto |
| 2008/0023232 | A1 | 1/2008 | Morag et al. |
| 2013/0106724 | A1 | 5/2013 | Pedersen et al. |

(Continued)

FOREIGN PATENT DOCUMENTS

| KR | 10-2016-0016065 A | 2/2016 |
| KR | 10-2017-0111372 A | 10/2017 |
| KR | 10-2017-0132754 A | 12/2017 |

*Primary Examiner* — Calvin C Ma
(74) *Attorney, Agent, or Firm* — Cha & Reiter, LLC (57) ABSTRACT

Introduced is an electronic device comprising: a housing forming an outer appearance of the electronic device; an inductor disposed in the housing; a weight body coupled to the inductor and disposed to have a position that changes inside the electronic device according to the movement of the electronic device; a first conductor disposed on a first location of the housing; and a second conductor disposed on a second location of the housing, wherein the electronic device is configured such that a signal of a resonant frequency on the basis of locations of the first conductor, the second conductor, and the weight body is emitted, in response to a signal obtained from an external electronic device. Other various embodiments are possible.

15 Claims, 8 Drawing Sheets

(56) References Cited

U.S. PATENT DOCUMENTS

| | | | |
|---|---|---|---|
| 2014/0104224 A1* | 4/2014 | Ih | G06F 3/03545 |
| | | | 345/174 |
| 2014/0306926 A1* | 10/2014 | Lee | G06F 3/0445 |
| | | | 345/174 |
| 2014/0306928 A1 | 10/2014 | Pedersen et al. | |
| 2017/0277284 A1 | 9/2017 | Kim et al. | |
| 2018/0011557 A1* | 1/2018 | Katsurahira | G06F 3/041 |

* cited by examiner

ELECTRONIC DEVICE, AND METHOD FOR CONTROLLING EXTERNAL ELECTRONIC DEVICE ON BASIS OF USAGE STATE OF ELECTRONIC DEVICE

CROSS REFERENCE TO RELATED APPLICATIONS

This application is a National Phase Entry of PCT International Application No. PCT/KR2019/002031, which was filed on Feb. 20, 2019, and claims a priority to Korean Patent Application No. 10-2018-0019997, which was filed on Feb. 20, 2018, the contents of which are incorporated herein by reference.

TECHNICAL FIELD

The disclosure relates to an electronic device capable of generating different resonant frequencies, based on a state in which the electronic device is used, and a method for controlling an external electronic device, based on the state in which the electronic device is used.

BACKGROUND ART

Electronic devices, such as a stylus and an electronic pen, have been developed in order to improve the precision of a touch input in relation to various external electronic devices using a touch screen. The electronic pens are provided in an active type that requires separate power and a passive type that requires no power.

DISCLOSURE OF INVENTION

Technical Problem

Conventionally, in order to input a desired function into an external electronic device using an electronic device, it is necessary to enter a menu of the external electronic device and select a corresponding function, which may be inconvenient for a user. In addition, in order to perform various functions using the electronic device, it is necessary to generate a plurality of resonant frequencies and mount a plurality of circuit modules (PBA, printed board assembly) for this purpose, which may increase the cost of a product. An electronic device according to an embodiment of the disclosure may generate, depending on a state in which the electronic device is used, different resonant frequencies to perform various functions without additionally operating a switch or manipulating a menu of an external electronic device.

Solution to Problem

An electronic device according to an embodiment of the disclosure includes: a housing forming an outer appearance of an electronic device; an inductor disposed in the housing; a weight body coupled to the inductor and disposed to have a position that changes inside the electronic device according to the movement of the electronic device; a first conductor disposed at a first location of the housing; and a second conductor disposed at a second location of the housing, and may be configured such that a signal of a resonant frequency based on the locations of the first conductor, the second conductor, and the weight body is emitted, in response to a signal obtained from an external electronic device.

An external electronic device according to an embodiment of the disclosure includes: a sensor panel for supplying electromagnetic energy to an electronic device; a reception panel for recognizing a resonant frequency of the electronic device; a sensing sensor for identifying a placed state of the external electronic device; and a processor electrically connected to the sensor panel, the reception panel, and the sensing sensor, the processor controlling the operation of the sensor panel, based on information obtained from the sensing sensor and performing a preconfigured function by matching a resonant frequency obtained from the reception panel with the information obtained from the sensing sensor.

A method for controlling an external electronic device according to an embodiment of the disclosure may include: identifying a placed state of the external electronic device; controlling the supply current of a sensor panel; recognizing a resonant frequency through a reception panel; and performing a preconfigured function in response to the received resonant frequency.

Advantageous Effects of Invention

Depending on a state in which a user uses an electronic device, an inductor and a weight body in the electronic device move, and the type of conductor electrically connected thereto is changed, whereby the type of a resonant frequency generated thereby can be diversified.

Various functions can be performed by matching a function corresponding to a resonant frequency without additionally manipulating a menu of an external electronic device.

MODE FOR THE INVENTION

Figure 1:
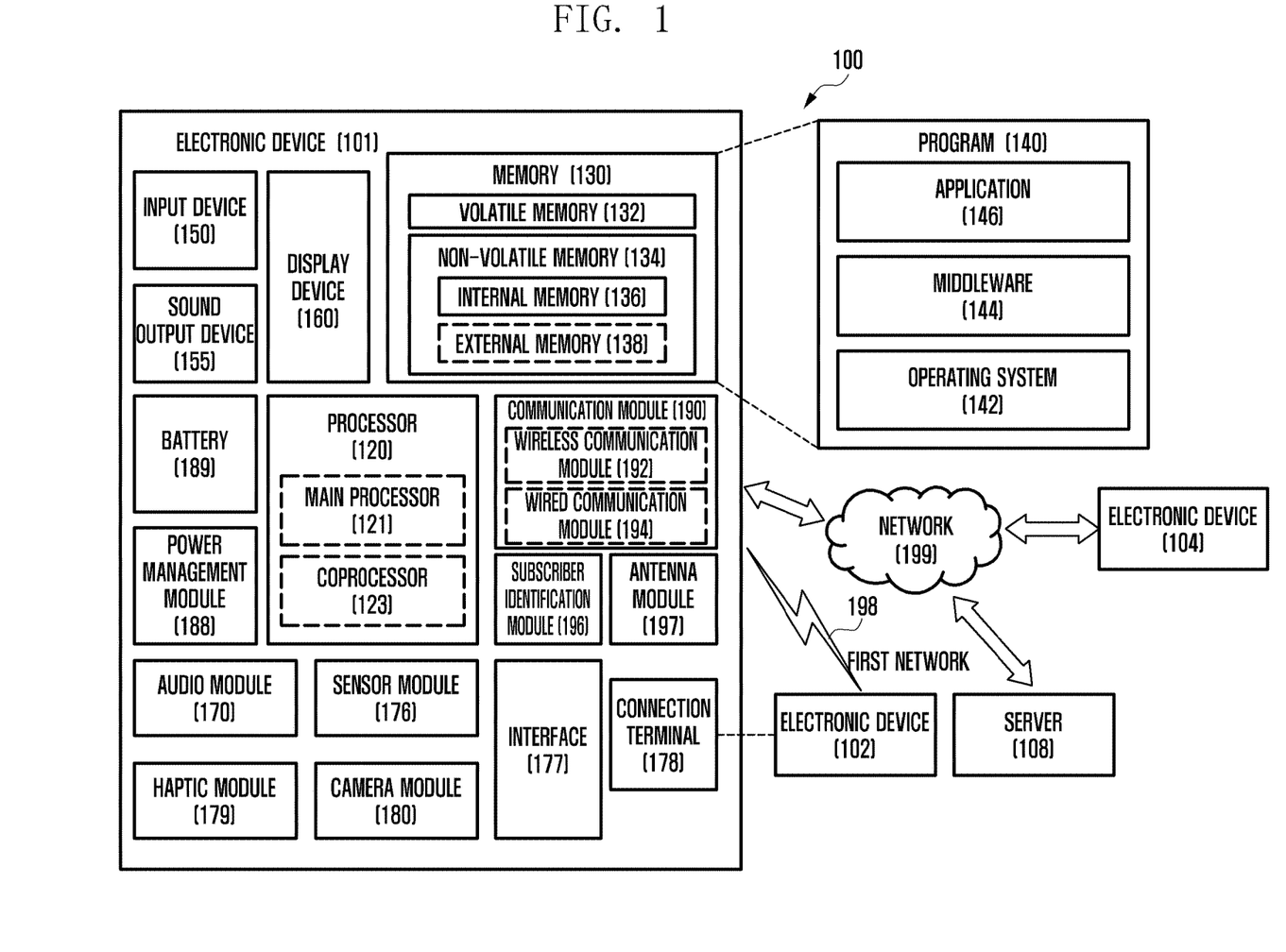
FIG. 1 is a block diagram of an external electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
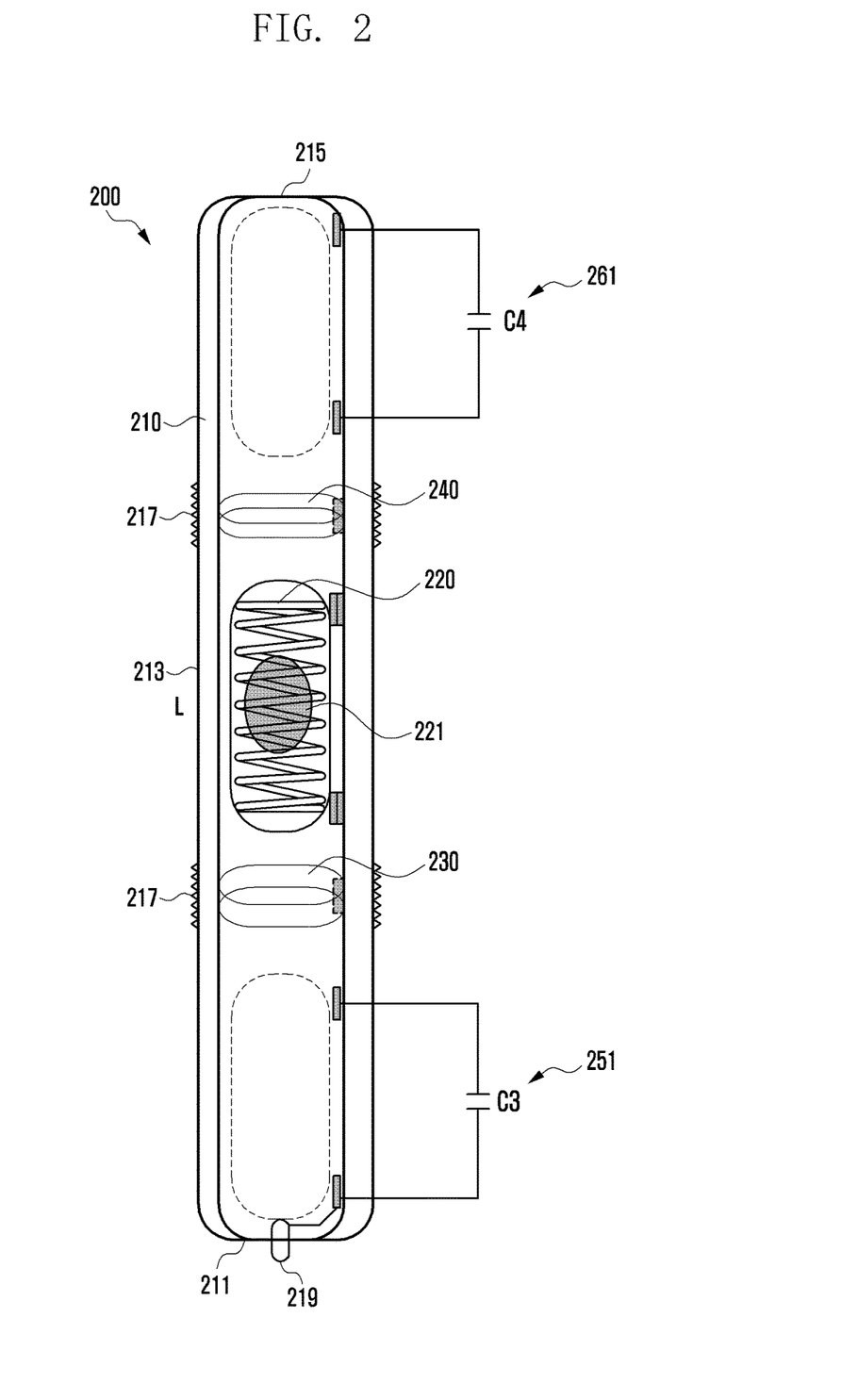
FIG. 2 illustrates a configuration of an electronic device according to an embodiment of the disclosure.

FIG. 2 illustrates a configuration of an electronic device 200 according to an embodiment of the disclosure.

The electronic device 200 according to an embodiment of the disclosure may include a housing 210, an inductor 220, a weight body 221, a first conductor 230, and a second conductor 240.

The housing 210 according to an embodiment may have a hollow pipe shape, and may have an electronic pen shape gripped and used by a user. The pipe shape may be variously formed, and may have a circular shape, a square shape, and a symmetrical or asymmetrical shape. The housing 210 may include a nib portion 219 disposed at one side end 211 thereof, and may be formed to be flat at the other side end 215 thereof.

Figure 7:
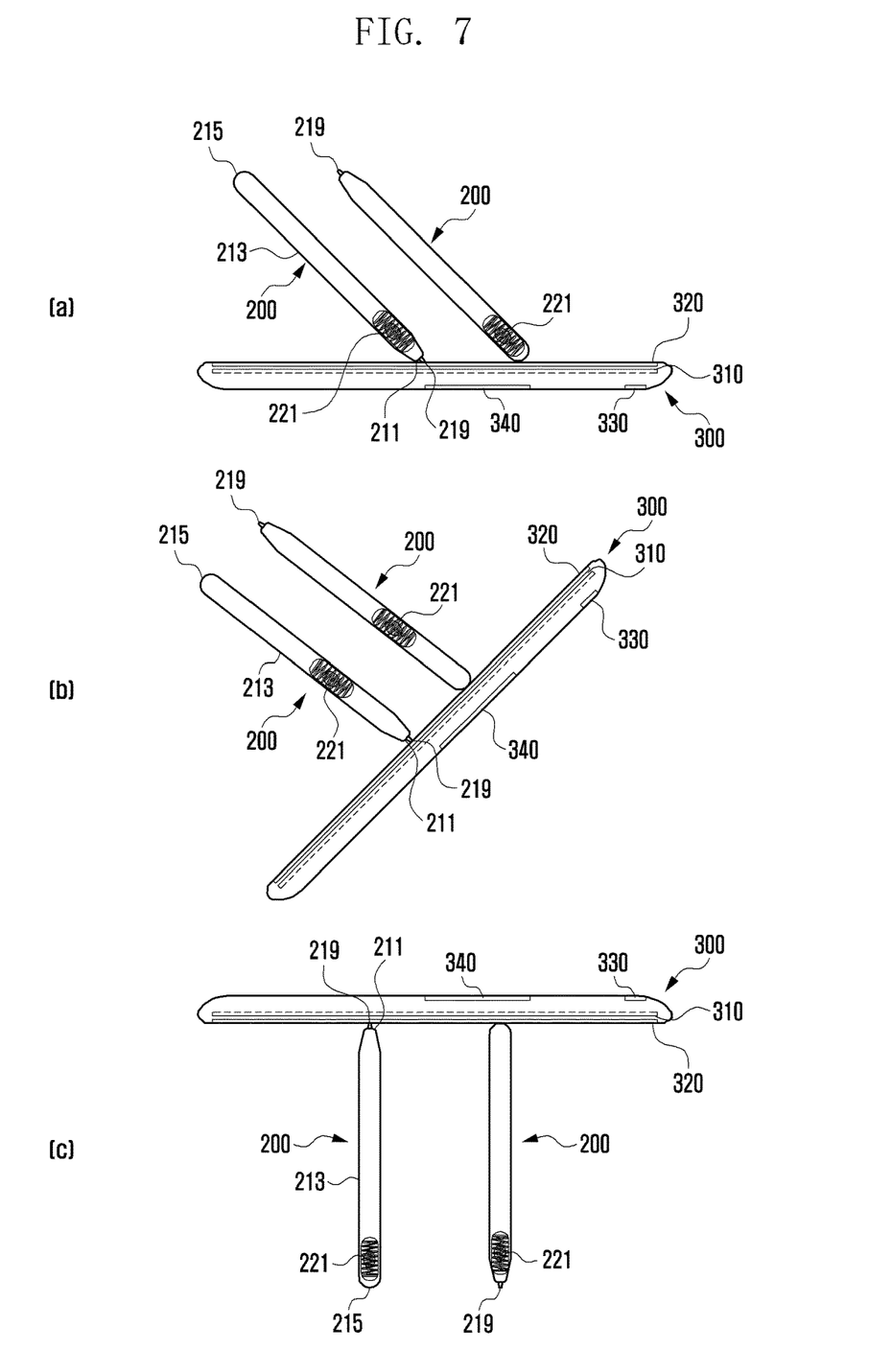
FIGS. 7A, 7B, and 7C illustrate movements of the electronic device in response to the placed state of an external electronic device, according to an embodiment of the disclosure.

The nib portion 219 according to an embodiment may function to transmit a user's operation to a reception panel 320 (see FIG. 7A) of an external electronic device 300 (see FIG. 7A). The nib portion 219 has a pointed tip and thus may precisely transfer a user's operation to the reception panel 320 (see FIG. 7A). In contrast, the other side end 215 is thick, compared to the nib portion 219, and thus may transfer a user's operation performed on a wider area to the reception panel 320 (see FIG. 7A).

The inductor 220 according to an embodiment may be induced by an electromagnetic field generated by a sensor panel 310 (see FIG. 7A) of the external electronic device 300 (see FIG. 7A) to generate a specific inductance value.

The weight body 221 according to an embodiment may be disposed to be movable along a hollow space in the housing 210, and may be coupled to the inductor 220 to allow the inductor 220 to be movable along the hollow space of the housing 210. The weight body 221 may be formed of a non-conductive member so as not to affect an inductance value of the inductor 220 or capacitance values of various conductors to be described later.

The weight body 221 according to an embodiment may serve as a weight, and may be moved within the housing 210 by gravity. For example, when the electronic device 200 is erected such that the one side end 211 of the housing 210 faces downwards, the weight body 221 and the inductor 220 may move toward the one side end 211, and when the electronic device 200 is inverted such that the other side end 215 of the housing 210 faces downwards, the weight body 221 and the inductor 220 may move toward the other side end 215.

A first conductor 230 according to an embodiment may be disposed at a first location of the housing 210, and may have a ring shape along the inner circumferential surface of the housing 210. The first location may be formed between the one side end 211 of the housing 210 and a center portion 213 of the housing 210 within the housing 210. The first location may refer to a position at which a user's thumb, index finger, or middle finger is mainly located when the electronic device 200 is gripped by a user such that the one side end 211 of the housing 210 faces downwards. The first conductor 230 may be disposed at the first location of the housing 210, may have a ring shape along the inner circumferential surface of the housing 210, and may generate a first capacitance value 231 when the first location is gripped by the user.

A second conductor 240 according to an embodiment may be disposed at a second location of the housing 210, and may have a ring shape along the inner circumferential surface of the housing 210. The second location may be formed between the other side end 215 of the housing 210 and the center portion 213 of the housing 210 within the housing 210. The second location may refer to a position at which a user's thumb, index finger, or middle finger is mainly located when the electronic device 200 is gripped by a user such that the other side end 215 of the housing 210 faces downwards. The second conductor 240 may be disposed at the second location of the housing 210, may have a ring shape along the inner circumferential surface of the housing 210, and may generate a second capacitance value 241 when the second location is gripped by the user.

The inductor 220 according to an embodiment may always be electrically connected either to the first conductor 230 or to the second conductor 240 in the process in which the weight body 221 moves within the housing 210. For example, when the weight body 221 is located close to the one side end 211 with reference to the center portion 213, the inductor 220 may be electrically connected to the first conductor 230, and when the weight body 221 is located close to the other side end 215 with reference to the center portion 213, the inductor 220 may be electrically connected to the second conductor 240.

A third conductor and a fourth conductor may be respectively disposed at the one side end 211 and the other side end 215 of the housing 210 according to an embodiment of the disclosure.

When the weight body 221 has moved to the one side end 211, the third conductor according to an embodiment may be connected to the inductor 220 and the first conductor 230 to generate a third capacitance value 251. When the weight body 221 has moved to the other side end 215, the fourth conductor may be connected to the inductor 220 and the second conductor 240 to generate a fourth capacitance value 261. The third capacitance value 251 and the fourth capacitance value 261 generated by the third and fourth conductors may be identical.

An uneven portion 217 may be formed at a first location of the housing 210 along the outer circumferential surface of the housing 210 according to an embodiment of the disclosure. The uneven portion 217 formed on the outer circumferential surface of the housing 210 may prevent the electronic device 200 from slipping when the electronic device 200 is gripped by a user, and may induce the user to grip the electronic device 200 at the first location.

Similarly, the uneven portion 217 may also be formed at the second location of the housing 210 along the outer circumferential surface of the housing 210 according to an embodiment of the disclosure. The uneven portion 217 formed on the outer circumferential surface of the housing 210 may prevent the electronic device 200 from slipping when the electronic device 200 is gripped by a user, and may induce the user to grip the electronic device 200 at the second location.

Figure 3:
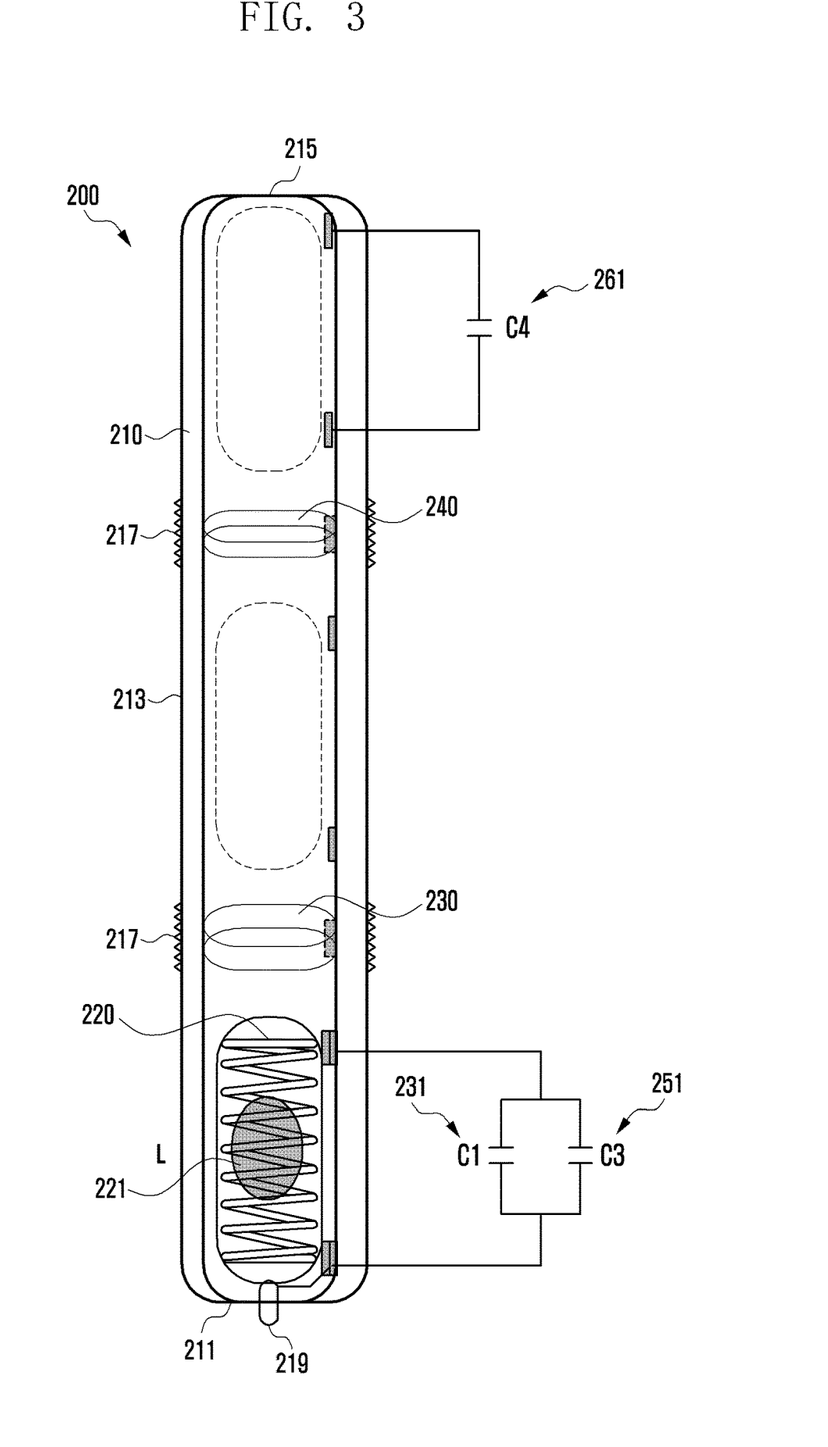
FIG. 3 illustrates a first state of an electronic device according to an embodiment of the disclosure.

FIG. 3 illustrates a first state of the electronic device 200 according to an embodiment of the disclosure.

In describing the electronic device 200 according to an embodiment of the disclosure, the same reference numerals as shown in FIG. 2 are used for the same components, and a description related to the components will be omitted, and differences thereof will be mainly described.

The first state according to an embodiment may refer to a state in which the weight body 221 of the electronic device 200 is located at the one side end 211 of the housing 210. In the first state, the first conductor 230, the third conductor, and the inductor 220 may be electrically connected, and the first resonant frequency may be generated by the first capacitance value 231, the third capacitance value 251, and the inductance value.

A value of a resonant frequency generated by the inductor 220 and a conductor may be defined as follows, $$f_0 = \frac{1}{2\pi\sqrt{LC}},$$

wherein $f_0$ indicates a resonant frequency, L indicates an inductance value, and C indicates a capacitance value.

The first resonant frequency may be defined as follows, $$f_1 = \frac{1}{2\pi\sqrt{L(C_1 + C_3)}},$$

wherein $f_1$ indicates a first resonant frequency, L indicates an inductance value, $C_1$ indicates a first capacitance value, and s indicates a third capacitance value.

Figure 4:
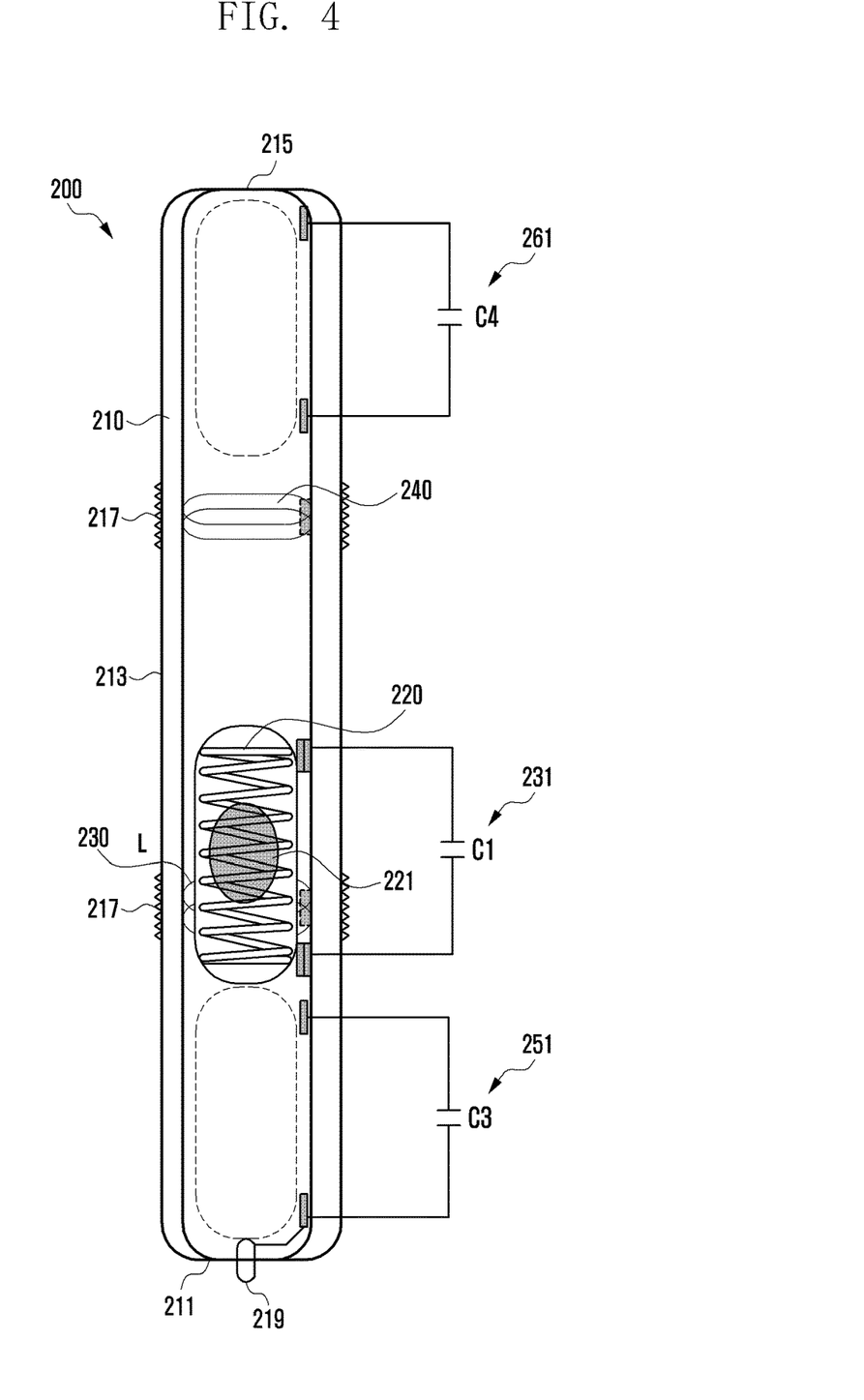
FIG. 4 illustrates a second state of the electronic device according to an embodiment of the disclosure.

FIG. 4 illustrates a second state of the electronic device 200 according to an embodiment of the disclosure.

The second state according to an embodiment may refer to a state in which the weight body 221 is located at an arbitrary position between the center portion 213 and the one side end 211 of the housing 210 of the electronic device 200. FIG. 4 illustrates a state in which the weight body 221 is located near the center portion 213 of the housing 210, but is not limited thereto. That is, the second state may refer to the state in which the weight body 221 has not moved completely to the one side end 211 but is located closer to the one side end 211 than the other side end 215.

In the second state, the first conductor 230 and the inductor 220 may be electrically connected, and a second resonant frequency may be generated by the first capacitance value 231 and the inductance value.

The second resonant frequency may be defined as follows, $$f_2 = \frac{1}{2\pi\sqrt{LC_1}},$$

wherein $f_2$ indicates a second resonant frequency, L indicates an inductance value, and $C_1$ indicates a first capacitance value.

Figure 5:
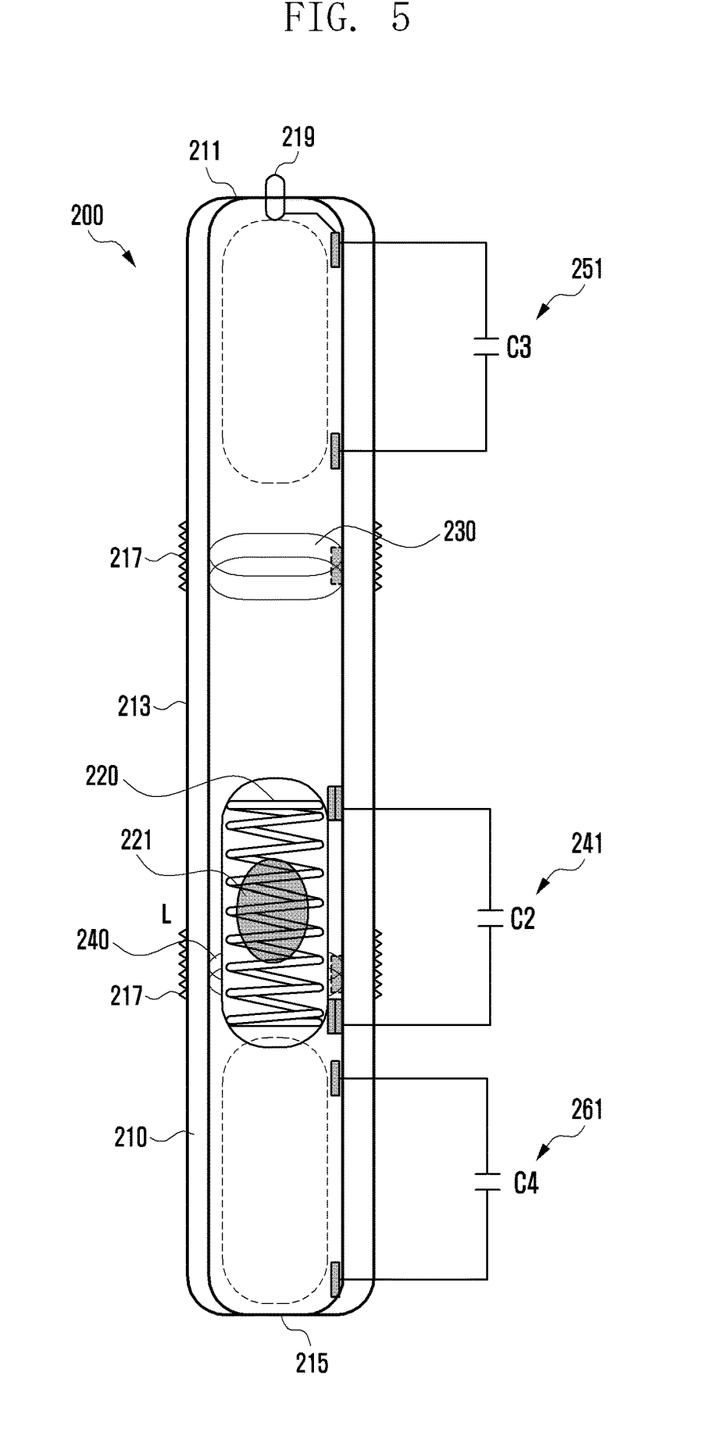
FIG. 5 illustrates a third state of the electronic device according to an embodiment of the disclosure.

FIG. 5 illustrates a third state of the electronic device 200 according to an embodiment of the disclosure.

The third state according to an embodiment may refer to a state in which the weight body 221 is located at any arbitrary position between the center portion 213 and the other side end 215 of the housing 210 of the electronic device 200. As in the case of FIG. 4 described above, FIG. 5 shows a state in which the weight body 221 is located near the center portion 213 of the housing 210, but is not limited thereto. That is, the third state may refer to a state in which the weight body 221 has not moved completely to the other side end 215, but is located closer to the other side end 215 than the one side end 211.

In the third state, the second conductor 240 and the inductor 220 may be electrically connected, and a third resonant frequency may be generated by the second capacitance value 241 and the inductance value.

The third resonant frequency may be defined as follows, $$f_3 = \frac{1}{2\pi\sqrt{LC_2}},$$

wherein $f_2$ indicates a third resonant frequency, L indicates an inductance value, and $C_2$ indicates a second capacitance value.

Figure 6:
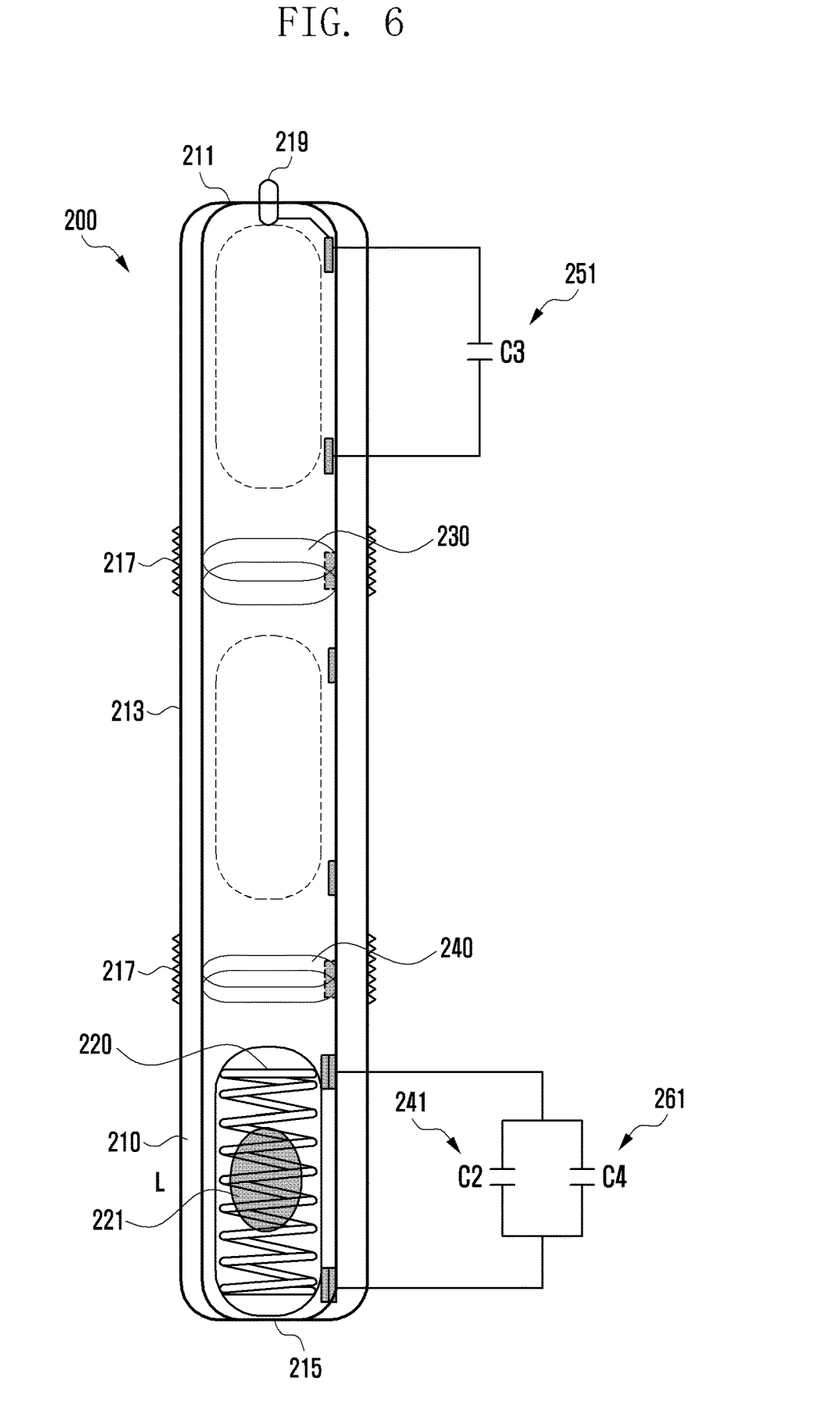
FIG. 6 illustrates a fourth state of the electronic device according to an embodiment of the disclosure.

FIG. 6 illustrates a fourth state of the electronic device 200 according to an embodiment of the disclosure.

The fourth state according to an embodiment may refer to a state in which the weight body 221 of the electronic device 200 is located at the other side end 215 of the housing 210. In the fourth state, the second conductor 240, the fourth conductor, and the inductor 220 may be electrically connected, and a fourth resonance frequency may be generated by the second capacitance value 241, the fourth capacitance value 261, and the inductance value.

The fourth resonant frequency may be defined as follows, $$f_4 = \frac{1}{2\pi\sqrt{L(C_2 + C_4)}},$$

wherein $f_4$ indicates a fourth resonant frequency, L indicates an inductance value, $C_2$ indicates a second capacitance value, ands $C_4$ indicates a fourth capacitance value.

FIGS. 7A to 7C illustrate a movement of the electronic device 200 in response to a placed state of the external electronic device 300, according to an embodiment of the disclosure.

Specifically, FIG. 7A shows a case where the external electronic device 300 is placed in a normal planar state, FIG. 7B shows a case where the external electronic device 300 is placed in an inclined planar state, and FIG. 7C shows a case where the external electronic device 300 is placed in an inverse planar state.

The external electronic device 300 according to an embodiment of the disclosure may include a sensor panel 310, a reception panel 320, a sensing sensor 330, and a processor 340.

The sensor panel 310 according to an embodiment may supply electromagnetic energy to enable the inductor and the first to fourth conductors of the electronic device 200 to generate first to fourth resonant frequencies.

The reception panel 320 according to an embodiment may receive and recognize the first to fourth resonant frequencies generated by the electronic device 200.

The sensing sensor 330 according to an embodiment may identify the placed state of the external electronic device 300. The sensing sensor 330 may include a gyro sensor, an acceleration sensor, or the like, and the placed state of the external electronic device 300 may include a normal planar state, an inclined planar state, and an inverse planar state.

The processor 340 according to an embodiment may be electrically connected to the sensor panel 310, the reception panel 320, and the sensing sensor 330. The processor 340 controls the operating current of the sensor panel 310, based on information provided from the sensing sensor 330, and performs preconfigured functions, based on resonant frequency information provided through the reception panel 320.

The normal planar state shown in FIG. 7A may refer to a state in which the external electronic device 300 is used by a user while being placed on a flat surface, such as a desk. Alternatively, the normal planar state may refer to a state in which, even when the external electronic device 300 is used by a user while being held by the user, the external electronic device 300 is used similarly to when the external electronic device is placed on a desk.

When the electronic device 200 is used in the normal planar state, the electronic device 200 may sufficiently inclined as shown in FIG. 7A, so that the weight body 221 inside the electronic device 200 may move completely up to the one side end 211 or the other side end 215 of the housing. That is, the weight body 221 of the electronic device 200 may be in the state shown in FIG. 3 or 6. In this case, the external electronic device 300 may perform a preconfigured function in response to the first resonant frequency or the fourth resonant frequency. For example, a first function may be performed in response to the first resonant frequency, and a second function may be performed in response to the fourth resonant frequency. As examples of specific first to second functions, the first function may be a function in which the electronic device 200 operates as a pen, and the second function may be a function in which the electronic device 200 operates as an eraser.

The inclined planar state shown in FIG. 7B may refer to a state in which the external electronic device 300 is used by a user while be inclined at a predetermined angle to use the same. Alternatively, the inclined planar state may refer to a state in which, even when the external electronic device 300 is used by a user while being held by the user, the external electronic device 300 is used while being inclined at a predetermined angle.

When the electronic device 200 is used in the inclined planar state, the electronic device 200 may be insufficiently inclined as shown in FIG. 7B, so that the weight body 221 inside the electronic device 200 may fail to move completely to the one side end 211 or the other side end 215 of the housing. That is, the weight body 221 of the electronic device 200 may be in the state shown in FIG. 4 or 5. In this case, the external electronic device 300 may perform a preconfigured function in response to the second resonant frequency or the third resonant frequency.

Compared to the case in FIG. 7A, the resonant frequencies generated by the electronic device 200 may be different, but the user's operational purpose may be identical. Accordingly, the first function may be performed in response to the second resonant frequency, and the second function may be performed in response to the third resonant frequency.

The inverse planar state shown in FIG. 7C may refer to a state in which the external electronic device 300 is used by a user while being placed such that the screen thereof faces the ground. Alternatively, the inverse planar state may refer to a state in which, even when the external electronic device 300 is held by the user, the external electronic device 300 is used while being placed such that the screen thereof faces the ground, as in a case in which the user uses the external electronic device 300 while lying down.

When the electronic device 200 is used in the inverse planar state, the electronic device 200 may sufficiently inclined as shown in FIG. 7C, so that the weight body 221 inside the electronic device 200 may move completely up to the one side end 211 or the other side end 215 of the housing. That is, the weight body 221 of the electronic device 200 may be in the state shown in FIG. 3 or 6.

However, contrary to the case of FIG. 7A, even if the nib portion of the electronic device 200 is positioned to face the external electronic device 300, the weight body 221 may be located at the other side end 215. In addition, even if the other side end 215 of the electronic device 200 is positioned to face the external electronic device 300, the weight body 221 may be located at the one side end 211. That is, in contrast to the case of FIG. 7A, the actual resonant frequency may be generated oppositely to a user's operational purpose.

Accordingly, in this case, the external electronic device 300 may perform the second function in response to the first resonant frequency, and may perform the first function in response to the fourth resonant frequency.

Figure 8:
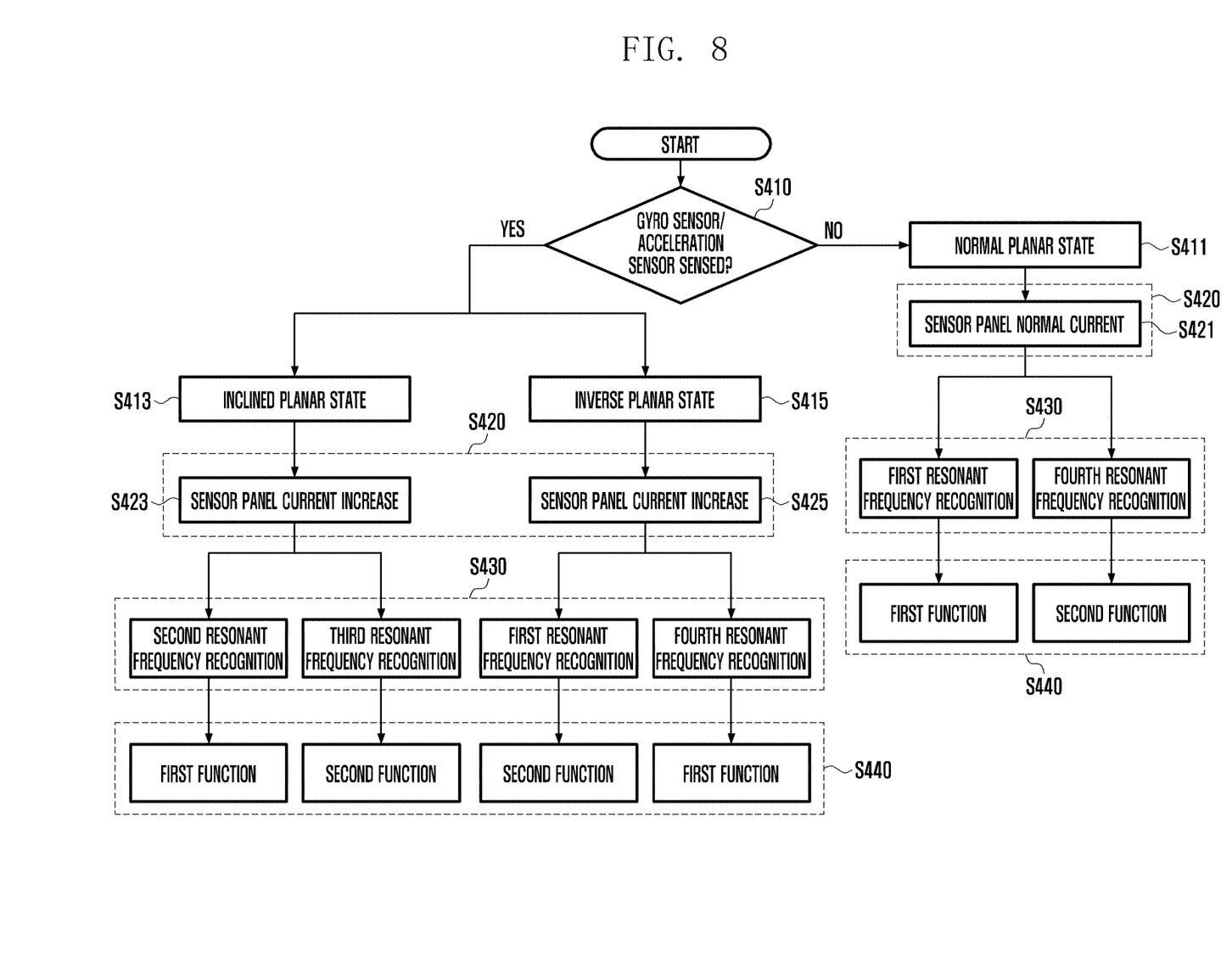
FIG. 8 is a flowchart showing a method for controlling of an external electronic device according to an embodiment of the disclosure.

FIG. 8 is a flowchart showing a method for controlling an external electronic device according to an embodiment of the disclosure.

A processor of the external electronic device according to an embodiment of the disclosure may identify the placed state of the external electronic device using a gyro sensor, an acceleration sensor, or the like (S410). The processor may control the current of a sensor panel, based on the placed state of the external electronic device, which has been identified in operation S410 (S420). When the external electronic device is identified to be in a normal planar state (S411), the processor may cause normal current to be supplied to the sensor panel (S421).

When the external electronic device is identified to be in an inclined planar state (S413) or an inverse planar state (S415), the processor may cause the current supplied to the sensor panel to be increased (S423, S425). When the current supplied to the sensor panel is increased, the range of the electromagnetic field generated by the sensor panel may be widened, and accordingly, the distance at which the electronic device is operable while being spaced apart from the external electronic device may be longer.

For example, in the case shown in FIG. 7B corresponding to the inclined planar state, an element (e.g., an inductor or a first conductor) capable of generating a resonant frequency is further away from a screen of the external electronic device, compared to the case shown in FIG. 7A corresponding to the normal planar state. In this case, if only the normal current is supplied to the sensor panel, the external electronic device in the state shown in FIG. 7B may not recognize the electronic device or accuracy thereof may be deteriorated. Therefore, the current supplied to the sensor panel may be increased to widen a range in which the electromagnetic field is generated, so that the electronic device may generate a resonant frequency having sufficient intensity.

The case shown in FIG. 7C corresponding to the inverse planar state may also be similar to the case shown in FIG. 7B. Therefore, even when the external electronic device is determined to be placed in the inverse planar state, the current supplied to the sensor panel may be increased.

The external electronic device may perform a predetermined function (S440) in response to a resonant frequency generated in the electronic device (S430).

In a case where the external electronic device is determined to be in the normal planar state, a first function may be performed when a first resonant frequency is recognized through a reception panel, and a second function may be performed when a second resonant frequency is recognized through a reception panel. For example, if the first function is the function in which the electronic device operates as a pen, the second function may be the function in which the electronic device operates as an eraser.

When the external electronic device is determined to be in the inclined planar state, the first function may be performed when the second resonant frequency is recognized through the reception panel, and the second function may be performed when a third resonant frequency is recognized through the reception panel. As the case in the normal planar state, for example, if the first function is the function in which the electronic device operates as a pen, the second function may be the function in which the electronic device operates as an eraser.

When the external electronic device is determined to be in the inverse planar state, the second function may be performed when the first resonant frequency is recognized through the reception panel, and the first function may be performed when a fourth resonant frequency is recognized through the reception panel.

As illustrated in FIG. 7C, when the electronic device is used in the inverse planar state, the fourth resonant frequency may be generated by the electronic device even if the first function is desired by a user. In addition, the first resonant frequency may be generated by the electronic device even if the second function is desired by a user. Accordingly, in a case where the external electronic device is recognized to be in the inverse planar state, the second function may be performed when the first resonant frequency is recognized, and the first function may be performed when the fourth resonant frequency is recognized.

An electronic device according to an embodiment of the disclosure includes: a housing forming an outer appearance of the electronic device; an inductor disposed in the housing; a weight body coupled to the inductor and disposed to have a position that changes inside the electronic device in response to the movement of the electronic device; a first conductor disposed at a first location of the housing; and a second conductor disposed at a second location of the housing, and may be configured such that a signal of a resonant frequency based on the locations of the first conductor, the second conductor, and the weight body is emitted, in response to a signal obtained from an external electronic device.

The housing may have a pipe shape, the first location may be formed between one side end of the housing and a center portion of the housing, and the second location may be formed between the other side end and the center portion of the housing.

A third conductor and a fourth conductor may be disposed at the one side end and the other side end of the housing, respectively.

The movement of the non-conductive member includes: a first state in which the weight body is located at the one side end of the housing; a second state in which the weight body is located between the one side end and the center portion of the housing; a third state in which the weight body is located between the other side end and the center portion of the housing; and a fourth state in which the weight body is located at the other side end of the housing.

In the first state, the first conductor, the third conductor, and the inductor may be electrically connected to generate a first resonant frequency.

In the second state, the first conductor and the inductor may be electrically connected to generate a second resonant frequency.

In the third state, the second conductor and the inductor may be electronically connected to generate a third resonant frequency.

In the fourth state, the second conductor, the fourth conductor, and the inductor may be electrically connected to generate a fourth resonant frequency.

The first conductor may generate a preconfigured first capacitance value when the first location is gripped by a user.

The second conductor may generate a preconfigured second capacitance value when the second location is gripped by a user.

The third conductor may generate a preconfigured third capacitance value in the first state.

The fourth conductor may generate a preconfigured fourth capacitance value in the fourth state.

An uneven portion is formed on the outer surface of the housing corresponding to the first location or the second location.

An external electronic device according to an embodiment of the disclosure includes: a sensor panel for supplying electromagnetic energy to an electronic device; a reception panel for recognizing a resonant frequency of the electronic device; a sensing sensor for identifying a placed state of the external electronic device; and a processor electrically connected to the sensor panel, the reception panel, and the sensing sensor, the processor controlling the operation of the sensor panel, based on information obtained from the sensing sensor and performing a preconfigured function by matching a resonant frequency obtained from the reception panel with the information obtained from the sensing sensor.

The processor may identify whether the external electronic device is in a normal planar state, an inclined planar state, or an inverse planar state through the information obtained from the sensing sensor, and may increase the operation current of the sensor panel when the external electronic device is in the inclined planar state or the inverse planar state.

In a case where the external electronic device is determined to be in the normal planar state, the processor performs the preconfigured first function when the first resonant frequency is sensed through the reception panel and performs the preconfigured second function when the fourth resonant frequency is sensed through the reception panel.

In a case where the external electronic device is determined to be in the inclined planar state, the processor performs the preconfigured first function when the second resonant frequency is sensed through the reception panel and performs the preconfigured second function when the third resonant frequency is sensed through the reception panel.

In a case where the external electronic device is determined to be in the inverse planar state, the processor performs the preconfigured second function when the first resonant frequency is sensed through the reception panel and performs the preconfigured first function when the fourth resonant frequency is sensed through the reception panel.

The sensing sensor includes a gyro sensor or an acceleration sensor.

A method for controlling an external electronic device according to an embodiment of the disclosure may include: identifying the placed state of the external electronic device; controlling the supply current of a sensor panel; recognizing a resonant frequency through a reception panel; and performing a preconfigured function in response to the received resonant frequency.

The invention claimed is:

1. An electronic device comprising:
   a housing forming an outer appearance of the electronic device;
   an inductor disposed in the housing;
   a weight body coupled to the inductor and disposed to have a location that changes inside the housing according to a movement of the electronic device; and
   a plurality of conductors, each of the plurality of conductors being disposed at different location of the housing,
   wherein at least one of the plurality of conductors is electrically connected to the inductor according to the location of the weight body and electrical connection between at least part of the plurality of conductors and the inductor is changed according to a change in the location of the weight body, and
   wherein the electronic device is configured such that a signal having a resonant frequency based on electrical connection between the inductor and the at least one of the plurality of conductors is emitted, in response to a signal obtained from an external electronic device.

2. The electronic device of claim 1, wherein the housing includes a pipe shape,
   wherein the plurality of conductors includes a first conductor and a second conductor, and
   wherein the first conductor is disposed at a first location which is formed between a first side end of the housing and a center portion of the housing, and the second conductor is disposed at a second location which is formed between the center portion and a second side end of the housing.

3. The electronic device of claim 2, wherein a third conductor and a fourth conductor are disposed at the first side end and the second side end of the housing, respectively.

4. The electronic device of claim 3, wherein a movement of the weight body comprises:
   a first state in which the weight body is located at the first side end of the housing;
   a second state in which the weight body is located between the center portion and the first side end of the housing;
   a third state in which the weight body is located between the center portion and the second side end of the housing; and
   a fourth state in which the weight body is located at the second side end of the housing.

5. The electronic device of claim 4, wherein, in the first state, the first conductor, the third conductor, and the inductor are electrically connected to generate a first resonant frequency.

6. The electronic device of claim 5, wherein the third conductor generates a preconfigured third capacitance value in the first state.

7. The electronic device of claim 5, wherein the fourth conductor generates a preconfigured fourth capacitance value in the fourth state.

8. The electronic device of claim 4, wherein, in the second state, the first conductor and the inductor are electrically connected to generate a second resonant frequency.

9. The electronic device of claim 4, wherein, in the third state, the second conductor and the inductor are electronically connected to generate a third resonant frequency.

10. The electronic device of claim 4, wherein, in the fourth state, the second conductor, the fourth conductor, and the inductor are electrically connected to generate a fourth resonant frequency.

11. The electronic device of claim 2, wherein the first conductor generates a preconfigured first capacitance value when the first location is held by a user.

12. The electronic device of claim 2, wherein the second conductor generates a preconfigured second capacitance value when the second location is held by a user.

13. The electronic device of claim 2, wherein an uneven portion is formed on an outer surface of the housing corresponding to the first location or the second location.

14. An external electronic device comprising:
   a sensor panel for supplying electromagnetic energy to an electronic device;
   a reception panel for recognizing a resonant frequency of the electronic device;
   a sensing sensor for identifying a placed state of the external electronic device; and
   a processor electrically connected to the sensor panel, the reception panel, and the sensing sensor,
   wherein the processor is configured to:
      control an operation of the sensor panel, based on information obtained from the sensing sensor; and
      perform a preconfigured function, based at least on information obtained from the sensing sensor and a resonant frequency emitted by the electronic device and obtained from the reception panel,
   wherein the electronic device includes an inductor having a location that changes inside the electronic device according to a movement of the electronic device and a plurality of conductors, each of the plurality of conductors are disposed at a different location of the electronic device, wherein at least one of the plurality of conductors is electrically connected to the inductor according to the location of the inductor, and wherein the electronic device is configured such that a signal having the resonant frequency based on electrical connection of the inductor and the at least one of the plurality of conductors is emitted, in response to the electromagnetic energy obtained from the external electronic device.

15. A method for controlling an external electronic device comprising:
    identifying a placed state of the external electronic device;
    controlling a supply current of a sensor panel;
    recognizing a resonant frequency through a reception panel; and
    performing a preconfigured function in response to the received resonant frequency emitted by an electronic device, wherein the electronic device includes an inductor having a location that changes inside the electronic device according to a movement of the electronic device and a plurality of conductors, each of the plurality of conductors are disposed at a different location of the electronic device, wherein at least one of the plurality of conductor is electrically connected to the inductor according to the location of the inductor, and wherein the electronic device is configured such that a signal having the resonant frequency based on electrical connection of the inductor and the at least one of the plurality of conductors is emitted, in response to electromagnetic energy obtained from the external electronic device.

* * * * *